United States Patent
Snoeren et al.

(10) Patent No.: US 7,664,302 B2
(45) Date of Patent: Feb. 16, 2010

(54) SIMULTANEOUS GRAYSCALE AND GEOMETRIC REGISTRATION OF IMAGES

(75) Inventors: Peter R. Snoeren, Gouda (NL); Nico Karssemeijer, Beek (NL)

(73) Assignee: Hologic, Inc., Marlborough, MA (US)

( * ) Notice: Subject to any disclaimer, the term of this patent is extended or adjusted under 35 U.S.C. 154(b) by 684 days.

(21) Appl. No.: 11/026,558

(22) Filed: Dec. 30, 2004

(65) Prior Publication Data

US 2005/0163360 A1 Jul. 28, 2005

Related U.S. Application Data

(63) Continuation-in-part of application No. 10/623,191, filed on Jul. 18, 2003.

(51) Int. Cl.
*G06K 9/00* (2006.01)
(52) U.S. Cl. ...................... 382/131; 382/151
(58) Field of Classification Search ........... 382/131
See application file for complete search history.

(56) References Cited

U.S. PATENT DOCUMENTS

| | | | |
|---|---|---|---|
| 5,133,020 A * | 7/1992 | Giger et al. ............ | 382/128 |
| 5,598,185 A | 1/1997 | Holmgren | |
| 5,627,907 A | 5/1997 | Gur et al. | |
| 5,644,649 A | 7/1997 | Schoeters et al. | |
| 5,644,650 A | 7/1997 | Suzuki et al. | |
| 5,729,620 A | 3/1998 | Wang | |
| 5,748,173 A | 5/1998 | Gur | |
| 5,768,333 A | 6/1998 | Abdel-Mottaleb | |
| 5,815,591 A | 9/1998 | Roehrig et al. | |
| 5,828,774 A | 10/1998 | Wang | |
| 5,854,851 A | 12/1998 | Bamberger et al. | |
| 5,896,524 A * | 4/1999 | Halstead et al. ......... | 713/375 |
| 5,917,929 A | 6/1999 | Marshall et al. | |
| 5,970,164 A | 10/1999 | Bamberger et al. | |
| 5,982,917 A * | 11/1999 | Clarke et al. ........... | 382/132 |
| 5,987,345 A | 11/1999 | Engelmann | |
| 6,014,452 A | 1/2000 | Zhang et al. | |

(Continued)

OTHER PUBLICATIONS

Gray Scale Registration of Mammograms Using a Model of Image Acquisition, Springer-Verlag Berlin Heidelberg, 2003, pp. 401-412, Shoeren et al.*

(Continued)

*Primary Examiner*—Bhavesh M Mehta
*Assistant Examiner*—David P Rashid
(74) *Attorney, Agent, or Firm*—Brian J. Daiuto

(57) ABSTRACT

Simultaneous grayscale and geometric registration of images, such as mammograms, facilitates temporal comparison and enhances the speed and reliability of computer aided diagnosis (CAD) detection of medical abnormalities. The method generally includes optimizing a merit function, e.g., sum of squared errors, containing parameters associated with a transformation function for simultaneous geometric and grayscale registering of the images, the optimizing of the merit function being performed by determining optimal values of the parameters using data in the images and registering one image to the other by applying the geometric and grayscale transformation function using the optimal values of the parameters. The optimizing may be performed iteratively from coarse to fine resolutions using a modified Levenberg-Marquardt method for optimizing nonlinear parameters with linear regression for optimizing linear parameters. A final iteration may be performed after removing pixel value pairs from the images that correspond to outliers of a joint pixel value histogram.

33 Claims, 4 Drawing Sheets

U.S. PATENT DOCUMENTS

| | | | |
|---|---|---|---|
| 6,035,056 | A | 3/2000 | Karssemeijer |
| 6,075,879 | A | 6/2000 | Roehrig et al. |
| 6,185,320 | B1 | 2/2001 | Bick et al. |
| 6,198,838 | B1 | 3/2001 | Roehrig et al. |
| 6,201,990 | B1 * | 3/2001 | Wexler et al. ............... 600/547 |
| 6,243,095 | B1 | 6/2001 | Shile et al. |
| 6,249,594 | B1 * | 6/2001 | Hibbard .................... 382/128 |
| 6,263,092 | B1 | 7/2001 | Roehrig et al. |
| 6,266,435 | B1 | 7/2001 | Wang |
| 6,301,378 | B1 | 10/2001 | Karssemeijer et al. |
| 6,404,908 | B1 | 6/2002 | Schneider et al. |
| 2002/0097902 | A1 | 7/2002 | Roehrig et al. |
| 2002/0138019 | A1 * | 9/2002 | Wexler et al. ............... 600/547 |
| 2003/0161519 | A1 * | 8/2003 | Vuylsteke .................. 382/128 |
| 2004/0008867 | A1 * | 1/2004 | Fein et al. .................. 382/100 |
| 2004/0165778 | A1 * | 8/2004 | Cartlidge et al. ............ 382/211 |

OTHER PUBLICATIONS

Multimodality Image Registration by Maximization of Mutual Information, IEEE Transactions of Medical Imaging, vol. 16, No. 2, Apr. 1997, pp. 187-198, Maes et al.*

Burt et al., "The Laplacian Pyramid as a Compact Image Code", IEEE Transactions on Communications, Apr. 1983, pp. 532-540, vol. COM-31, No. 4.

Fitzpatrick, J., et. al., "Chapter 8: Image Registration." Handbook of Medical Imaging—vol. 2—Medical Image Processing and Analysis, Eds. Sonka, M., et. al., SPIE Press (2000) pp. 447-513.

* cited by examiner

SIMULTANEOUS GRAYSCALE AND GEOMETRIC REGISTRATION OF IMAGES

CROSS REFERENCE TO RELATED APPLICATIONS

This application is a continuation-in-part of co-pending U.S. patent application Ser. No. 10/623,191, entitled "Model-Based Grayscale Registration of Medical Images," and filed on Jul. 18, 2003, the entirety of which is incorporated by reference herein.

BACKGROUND OF THE INVENTION

1. Field of the Invention

This patent specification generally relates to grayscale and geometric registration of images such as medical images. More specifically, simultaneous grayscale and geometric registration of two or more images, such as mammograms, for facilitating visual comparison thereof and enhancing the speed and reliability of computer aided diagnosis (CAD) detection of medical abnormalities, are disclosed.

2. Description of Related Art

Systems for computer aided diagnosis (CAD) assist radiologists in the detection and classification of abnormal lesions in medical images. The purpose of such devices, as described in U.S. Pat. No. 5,815,591 entitled "Method and Apparatus for Fast Detection of Spiculated Lesions in Digital Mammograms" and issued on Sep. 29, 1998 to Roehrig, et. al., the entirety of which is hereby incorporated by reference herein, is to direct the attention of a radiologist to suspicious areas of the medical image that may reflect a threatening condition. While not a replacement for the experienced radiologist, CAD systems are designed to increase efficiency and reduce error, as a typical radiologist may be required to examine hundreds of medical images per day, which can lead to the possibility of a missed diagnosis due to human error.

Desired characteristics of a CAD system for analyzing medical images such as mammograms include high speed (requiring less processing time), high sensitivity or precision (the ability to detect more subtle indications of abnormalities), and/or high accuracy (lower false positives, i.e., the number of areas marked "suspicious" by the CAD system which, in reality, are not suspicious or indicative of a possibly cancerous condition and lower false negatives, also called "misses"). It is noted that although "mammogram" is sometimes used in the art to depict a set of four related films or views but sometimes used to depict one such view, for clarity purposes, the term "mammogram" shall correspond to one of the related films or views taken during the mammography process.

Most commercial CAD systems today generally usually treat each digital medical image separately. In these CAD systems, the plurality of digital or digitized medical images are processed separately by the CAD system for detecting suspicious lesions. However, in radiology practice it is often useful to compare similar medical image views taken at different times and temporal comparisons may form an important part of the diagnostic procedure. Temporal comparisons can be made to detect interval changes indicating lesion growth, to monitor progression of a disease, and/or to estimate the effect of treatment.

One area where temporal comparison of medical images plays a major role is breast cancer screening using mammography. For example, if a breast develops a potentially suspicious lesion over a period of time as reflected by periodic mammograms of that breast, such as every twelve months, the likelihood increases that it is a true lesion. Studies have shown that the use of prior mammograms in screening effectively reduces the number of false positive referrals. See for example, Thurfjell, M. G., Vitak, B., Azavedo E., Svane G., Thurfjell E., "Effect on Sensitivity and Specificity of Mammography Screening With or Without Comparison of Old Mammograms," ACTA Radiologica, 41(1) (2000) 52-56; and Burnside, E. S., Sickles, E. A., Sohlich R. E., Dee K. E., "Differential Value of Comparison With Previous Examinations in Diagnostic Versus Screening Mammography," American Journal of Roentgenology, 179(5) (2002) 1173-1177, the entireties of which are incorporated by reference herein. This results from the fact that the use of prior mammograms allows radiologists to distinguish lesions that grow from normal dense structures in the breast that somehow look suspicious. Temporal comparison of mammograms in a CAD system is described in U.S. Pat. No. 6,075,879 to Roehrig et. al, which is incorporated by reference herein.

Breast cancer in women is a serious health problem, the American Cancer Society currently estimating that over 180,000 U.S. women are diagnosed with breast cancer each year. Breast cancer is the second major cause of cancer death among women, the American Cancer Society also estimating that breast cancer causes the death of over 44,000 U.S. women each year. While at present there is no means for preventing breast cancer, early detection of the disease prolongs life expectancy and decreases the likelihood of the need for a total mastectomy.

Currently, mammography using x-rays is the most common method of detecting and analyzing breast lesions. The current trend, however, is toward digital mammography. In the Netherlands, for example, where a nation-wide breast cancer screening program is implemented, about two million women in the 50 to 75 age group are invited once every two years for screening mammography. With an attendance of 80%, about 800,000 women have a screening mammography every year. It is expected that within the next few years all screening units in the country will convert to digital mammography. During a two year transition period, digital mammograms will need to be read in combination with the prior film-screen mammograms. Currently, it is expected that all most recent prior film-screen mammograms will be digitized to allow soft-copy reading.

Sometimes, temporal images are subtracted to enhance areas where differences occur. However, in conventional radiology the review of temporal image pairs may be seriously hampered by differences in acquisition. To some extent, positioning changes can be dealt with by geometric registration algorithms, the development of which received a lot of attention in recent years. See for example, Sallam, M. Y., Bowyer, K. W., "Registration and Difference Analysis of Corresponding Mammogram Images, Medical Image Analysis," 3(2) (1999) 103-118; and Wirth, M. A., Narhan, J., Gray, D., "Non-Rigid Mammogram Registration Using Mutual Information," Proc. SPIE Medical Imaging 2002: Image Processing, vol. 4684 (2002) 562-573, the entireties of which are incorporated by reference herein.

The differences in acquisition are generally attributed to changes in exposure and to different screen-film imaging and/or digital imaging systems. These differences may cause subsequent mammograms to appear dramatically different and thus reduce the effectiveness of temporal comparisons. Thus, for example, when visually comparing a current-year mammogram to a prior-year mammogram on a softcopy display, a radiologist can have difficulty detecting subtle anatomical differences between the mammograms, because their different acquisition parameters can make them appear very different in terms of grayscale levels. These differences may not be easily normalized as they may induce nonlinear gray scale changes. Although radiologists may adjust the relative contrast, brightness and/or position of the threshold of the S-curve (the HD-curve, named after Hurter and Driffeld) of one or more images, such a process can be inaccurate, tedious, annoying, and time-consuming and may reduce performance and efficiency and induce human errors. In other words, these acquisition differences cannot be easily or quickly corrected by the radiologists during display. In addition to negatively affecting visual comparison thereof, differences in grayscale settings/parameters between two temporally distinct mammograms of the same breast can be a disadvantage for temporal comparisons thereof in a CAD system, such as that described in U.S. Pat. No. 6,075,879 supra.

Accordingly, it would be desirable to facilitate visual comparison of two or more mammograms of a breast taken at different times and/or under different acquisition conditions. It would be further desirable to provide a computer-aided diagnosis (CAD) system that can effectively use information from multiple digital or digitized medical images, including sets taken at different times and/or under different acquisition parameters, to detect anatomical abnormalities therein. In a mammography setting, the multiple mammograms would be of the same or similar mammogram view of the same patient.

SUMMARY OF THE INVENTION

Simultaneous grayscale and geometric registration of two or more images, such as mammograms, for facilitating visual comparison thereof and enhancing the speed and reliability of computer aided diagnosis (CAD) detection of medical abnormalities, are disclosed. According to a preferred embodiment, numerical image processing algorithms are performed on two or more images, such as temporal medical images, to provide simultaneous geometric and grayscale registration thereof. The geometric and grayscale registered images may then be displayed and/or further processed for comparison thereof. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method enables a radiologist to make quick, effective and efficient temporal comparisons of medical images and thus requiring fewer manual and subjective adjustments to be made by the radiologist for optimal display of the mammograms. In addition or alternative to image display, the transformation method may also be used for computer aided detection methods that make use of temporal other comparative information.

In one embodiment, the method generally includes optimizing a merit function, e.g., a sum of squared errors, containing parameters associated with a transformation function for simultaneous geometric and grayscale registering of the images, the optimizing of the merit function being performed by determining optimal values of the parameters using data in the images and registering one image to the other by applying the geometric and grayscale transformation function using the optimal values of the parameters. The optimizing may be performed iteratively from coarse to fine resolutions, each iteration utilizing results from the previous iteration. The parameters include nonlinear and linear parameters and each optimization iteration may use a modified Levenberg-Marquardt method with linear regression. In particular, the linear and nonlinear parameters may be separately optimized, e.g., by fixing the values of the nonlinear parameters while optimizing the linear parameters using linear regression and fixing the values of the linear parameters while optimizing the nonlinear parameters using a modified Levenberg-Marquardt method. A preprocess may be performed to crop or segment a target portion and a remainder, non-target portion, e.g., background, etc., in each image so that the optimization uses only the respective target portion of each image.

A final iteration may be performed after removing pixel value pairs from the images that correspond to outliers of a joint pixel value histogram. In particular, optimizing the merit function may further include determining a preliminary set of optimal values of the parameters using data in the images, generating a joint histogram of pixel value pairs of the images using the preliminary set of optimal values of the parameters, the joint histogram having its mass centered about a curve, identifying outliers as points in the joint histogram that exceed a predetermined distance from the curve of the joint histogram, determining pixel value pairs in the first and second images corresponding to the outliers, and repeating the optimizing the merit function using data in the images without the pixel value pairs corresponding to the outliers.

In another embodiment, a system for registering two image generally includes an input for receiving data for the first and second images and a processor configured to optimize a merit function containing parameters associated with a transformation function for simultaneous geometric and grayscale registering of the images, the processor being configured to optimize the merit function by determining optimal values of the parameters using the data in the images, the processor being further configured to register the one image to the other by applying the geometric and grayscale transformation function using the optimal values of the parameters.

In yet another embodiment, a computer program product for directing a computing apparatus to automatically register two images generally includes computer code for optimizing a merit function containing parameters associated with a transformation function for simultaneous geometric and grayscale registering of the images, the optimizing being performed by determining optimal values of the parameters using data in the images and computer code for registering one image to the other by applying the geometric and grayscale transformation function using the optimal values of the parameters.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Simultaneous grayscale and geometric registration of two or more images, such as mammograms, for facilitating visual comparison thereof and enhancing the speed and reliability of computer aided diagnosis (CAD) detection of medical abnormalities, are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1A:
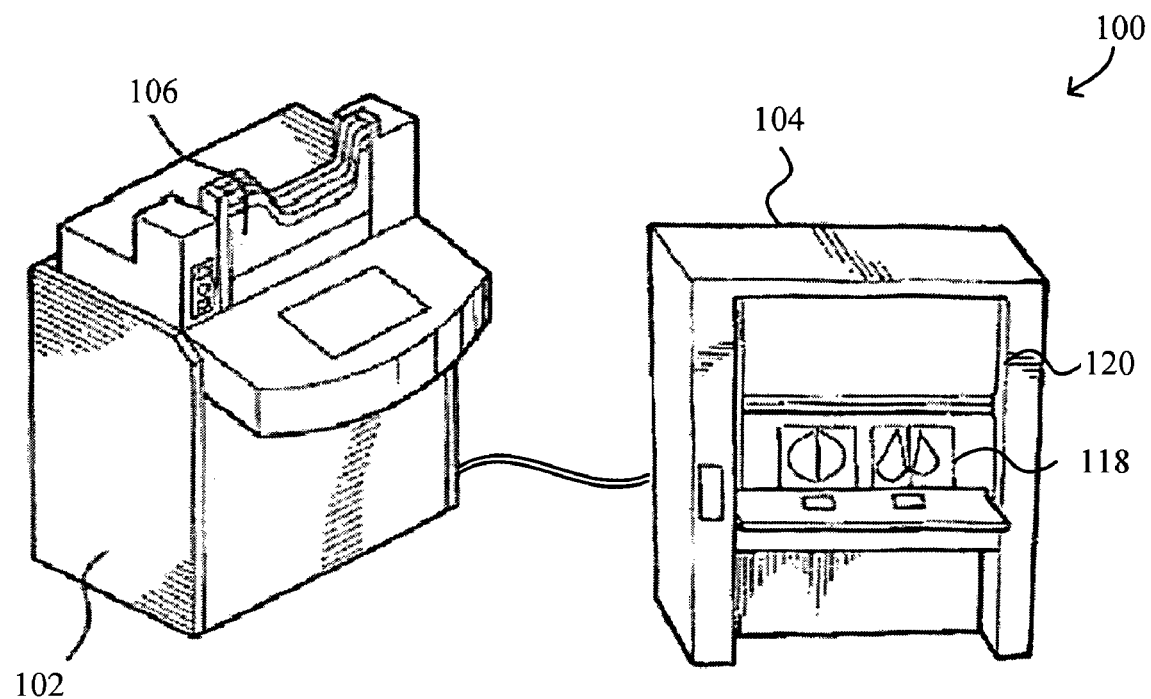
FIG. 1A shows an outside view of a computer aided diagnostic (CAD) system.

FIG. 1A shows an outside view of a computer aided diagnostic (CAD) system 100, such as an Image Checker M1000 from R2 Technology, Inc., for assisting in the identification of suspicious lesions in medical images such as mammograms. CAD system 100 generally includes a CAD processing unit 102 and a viewing station 104. The CAD processing unit 102 may scan and digitize an x-ray image, such as a developed x-ray mammogram 106, into a digital image and/or receive a digital image as input. According to a preferred embodiment, the CAD processing unit 102 receives at least two mammogram images of a same or similar view of the same breast, e.g., the craniocaudal (CC) or the mediolateral oblique (MLO) view, taken at different times in order to facilitate comparison of multiple medical images. The CAD processing unit 102 then processes the digitized and/or digital images to register the images relative to each other and outputs geometry and grayscale registered digital images for viewing at the viewing station 104. Additionally or alternatively, the CAD processing unit 102 may perform image processing steps to process at least one of the geometry and grayscale registered digital images in order to display a highlighted digital image having information directing the attention of the radiologist to suspicious areas. Preferably, the image process steps take into account a comparison of the multiple medical images.

Figure 1B:
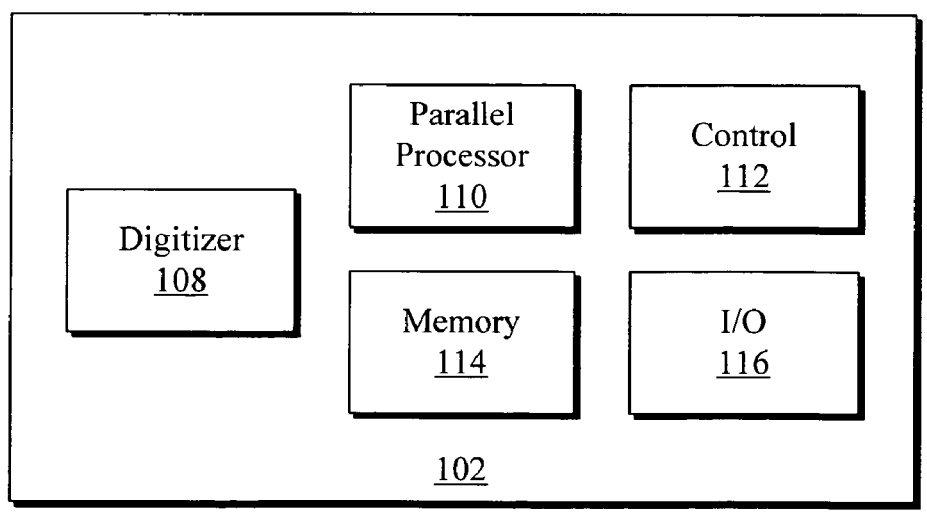
FIG. 1B is a block diagram of a CAD processing unit of the CAD system.

FIG. 1B is a block diagram illustrating the CAD processing unit 102 in more detail. The CAD processing unit 102 generally includes a digitizer 108, such as a laser scanner with 50 micron resolution, for digitizing the developed image 106 such as a developed x-ray mammogram. The CAD processing unit 102 generally also includes elements necessary for performing image processing including parallel processing steps. In particular, CAD processing unit 102 may also include elements such as a parallel processing unit 110, a central control unit 112, a memory 114, and an I/O unit 116. It is to be appreciated that the parallel processing unit 110 shown in FIG. 1B may be replaced by a single processor without departing from the scope of the preferred embodiments. It is to be further appreciated that in addition to the geometry and grayscale registration algorithms disclosed herein, the parallel processing unit 102 is capable of performing a multiplicity of other image processing algorithms.

Referring again to FIG. 1A, the viewing station 104 is preferably configured to allow the radiologist to conveniently view both the x-ray mammogram 106 and the output of the CAD processing unit 102 on a display device 118. The display device 118 may be, for example, a CRT screen. The display device 118 typically displays geometry and grayscale registered digital mammogram that may be optionally highlighted with information to direct the attention of the radiologist to suspicious areas as determined by image processing steps performed by the CAD processing unit 102. The viewing station 104 may also include a station 120 for viewing the actual x-ray mammogram 106 and/or the actual digital mammogram itself, e.g., without geometry and grayscale registration and/or without highlighting. The radiologist is assisted by the CAD system 100 by viewing the display device 118, which then facilitates comparison of multiple mammograms, such as a temporal comparison or a comparison of images of the left and right breast of a patient. The comparison helps with the detection by the radiologist of suspicious portions of the actual x-ray or digital mammogram itself. Further information regarding CAD system 100 may be found in U.S. Pat. No. 5,815,591.

The display device 118 of the viewing station 104 preferably displays at least two geometry and grayscale registered images of a same or similar view of one breast taken at different times in order to facilitate temporal comparison. It is noted that the CAD system 100 may also be used in accordance with the preferred embodiments to simultaneously display information relating to multiple views of the same breast, similar views of opposing breasts, and/or views of a single breast taken at different points in time. Thus, after geometry and grayscale registration, the radiologist may better make comparisons. The CAD system 100 may optionally further process the images to highlight specific areas of one or both of the mammogram images.

Note that although the preferred embodiments are described herein with respect to detection systems that process and analyze mammography x-ray films and mammography digital images, the present invention is readily adaptable to many other types of CAD systems. The present invention may be applicable to CAD systems that process and optionally analyze any type of film-based or digital-based medical images. For example, other X-ray imaging devices, ultrasound imaging, magnetic resonance imaging (MRI), computed tomography (CT) imaging, positron emission tomography (PET), scintillation camera imaging, and nuclear imaging all produce images that may be film- or digital-based. Additionally, film-based medical images are carried on a wide variety of film-like materials such as vellum or any other transparent or translucent media.

Although the description herein illustrates the registration of a first image to a second image, the method may be further applied to register additional images to the second image, e.g., to facilitate comparison of mammogram images from the current year, one year prior, and two years prior, etc. In one preferred embodiment, the geometry and grayscale image registration method is applied to temporal mammograms, e.g., from two screening rounds. Alternatively, the multiple related medical images may correspond to two views of the same breast, to similar views of two opposing breasts, e.g., the MLO view of the left and right breast of a single subject. In yet another embodiment, there are more than two related mammograms wherein the first two are of the same view, e.g., the CC view, of the left and right breasts, and the others are of the same view of the left and/or right breast from one or more prior screenings. Generally, the images to be registered are of the same or similar view and can be of different (left and right)

breast and/or taken at different times. It is to be appreciated that there are further combinations of the above mammograms to be input into the CAD processing unit that are within the scope of the preferred embodiments. It is to be further appreciated that the historical mammogram that was taken months or years earlier may be stored in digitized form in CAD memory 114, or other digital storage medium, without departing from the scope of the preferred embodiments. Indeed, the CAD memory 114 or other storage medium may contain an entire historical archive of prior digital mammograms taken of the same patient, and CAD processing unit may be modified to compare any of these historical digital mammograms of the same view derived therefrom to the current digital mammogram.

One reason to match or register multiple mammograms is to lessen the irrelevant differences between images due to acquisition. These differences may be attributable to variations in breast compression, exposure time, incident radiation intensity, and either film properties and digitization for screen-film mammograms or detector response for unprocessed digital mammograms. The geometry and grayscale registration method described herein could help reduce the radiologist's efforts to detect relevant differences like abnormal growth in breast tissue that signals breast cancer. In addition, the geometry and grayscale registration method may also be applicable in subtraction radiology and/or in the computer aided detection of abnormalities in temporal or other comparative mammograms.

Figure 2:
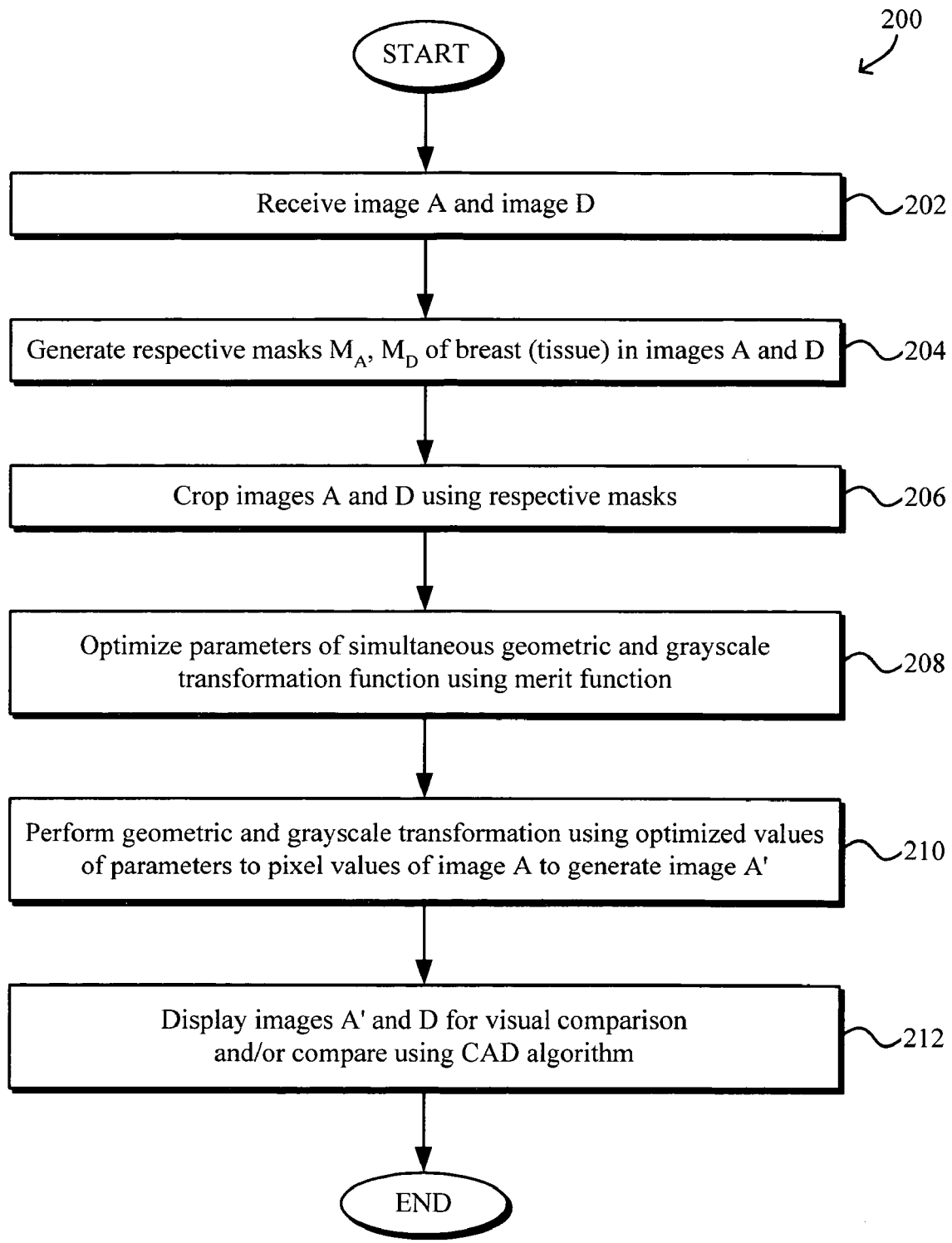
FIG. 2 is a flowchart illustrating an overall simultaneous geometric and grayscale registration process performed by the CAD system for registration of two or more images.

FIG. 2 is a flowchart illustrating an overall geometry and grayscale registration process 200 performed on two images by a processor such as one in the CAD processing unit 102. As noted above, the two images may be images of the same patient and of the same tissue, e.g., breast tissue on the same side, that were taken at different times to facilitate temporal comparison of the images. The two images may also be images of the same view of the left and right breasts taken at the same or different times. The processor receives analog image A and digital image D at block 202. However, the images may be any combination of digital and analog images, e.g., two digital images, two analog images, or an analog and a digital image. For example, where the received image is an x-ray image, such as a developed x-ray mammogram, the CAD system may additionally digitize the received analog image. As another example, the CAD system may directly receive an unprocessed digital mammogram as the input image.

Next, a pre-processing masking process is performed at blocks 204 and 206. The masking process removes portions of the images that is not the target tissue, e.g., a background and/or non-target tissue such as the pectoral muscle in a mammogram. The masking process helps to ensure that the images to be registered are based on the same tissue as much as possible. If the registration process is not performed on the same tissue in the images, for example, if the pectoral muscle is visible in one image and not in the other image, or, as another example, if a larger part of the background is visible in one image than in the other image, the portions of the image attributable to the pectoral muscle and/or the background would cause errors or deviations in the geometric (spatial) and grayscale registration.

In particular, at block 204, masks $M_A$, $M_D$ of breast (tissue) are, generated for images A and D, respectively. At block 206, images A and D are cropped or segmented using the masks so that only the breast (tissue) in images A and D remain. In the case of mammograms, images A and D are segmented so that the pectoral muscle and background portions of the images are removed and only the breast (tissue) remains. It is noted that blocks 204 and 206 merely illustrate one exemplary pre-processing masking process. Variations to the pre-processing masking process shown in blocks 204 and 206 may be implemented. For example, where the images are of the same view of the left and right breasts, the one image may be flipped or mirrored to facilitate geometric and grayscale registration processing. After the geometric and grayscale registration processing is complete, the mirrored image may be converted to the original configuration for display, e.g., to the radiologist.

At block 208, the parameters of a simultaneous (e.g., concurrent) geometric and grayscale transformation function $T_{A,D}\{g_A[T_G(x_D)]\}$ are optimized using a merit or cost function where $T_G(x_D)$ is the geometric transformation of a location $x_D$ in the digital image to a location $x_A$ in the analog image, $g_A$ is the normalized pixel value at location $x_A$ in the analog image, and $T_{A,D}$ is the grayscale transformation from analog to digital.

By optimizing the merit function, optimal values for parameters of the analog to digital geometric and grayscale transformation function $T_{A,D}\{g_A[T_G(x_D)]\}$ can be determined using the pixel values of the cropped images A and D. The transformation function $T_{A,D}\{g_A[T_G(x_D)]\}$ thus maps a pixel value in image A to a pixel value in image D. As is evident, a digital to analog transformation function $T_{A,D}^{-1}\{g_D[T_G^{-1}(x_A)]\}$ for mapping in the reverse direction, e.g., for mapping a pixel value in image D to a pixel value in image A, can also be determined using similar modeling and methods. Details of the transformation function $T_{A,D}\{g_A[T_G(x_D)]\}$ will be described below.

At block 210, the geometric and grayscale transform function $T_{A,D}\{g_A[T_G(x_D)]\}$ is applied to pixel values of image A using the optimized parameter values from block 208 to produce image A' so that the image A' is registered both geometrically and in grayscale to image D. The process 200 may be repeated where more than two images are to be compared. The additional images are preferably registered to the same image, e.g., image D. At block 212, images A' and D can be simultaneously displayed on a monitor for visual comparison such as by a radiologist. Alternatively or additionally, the CAD system may further perform image processing steps to compare images A' and D so as to highlight information in at least one of the images A' and D, preferably at least the more current image, in order to direct the attention of the radiologist to any suspicious areas. Such temporal comparisons can be carried out by the CAD system as described in U.S. Pat. No. 6,075,879 entitled "Method and System for Computer-Aided Lesion Detection Using Information From Multiple Images" and issued on Jun. 13, 2002 to Roehrig et al., the entirety of which is incorporated by reference herein.

Figure 3:
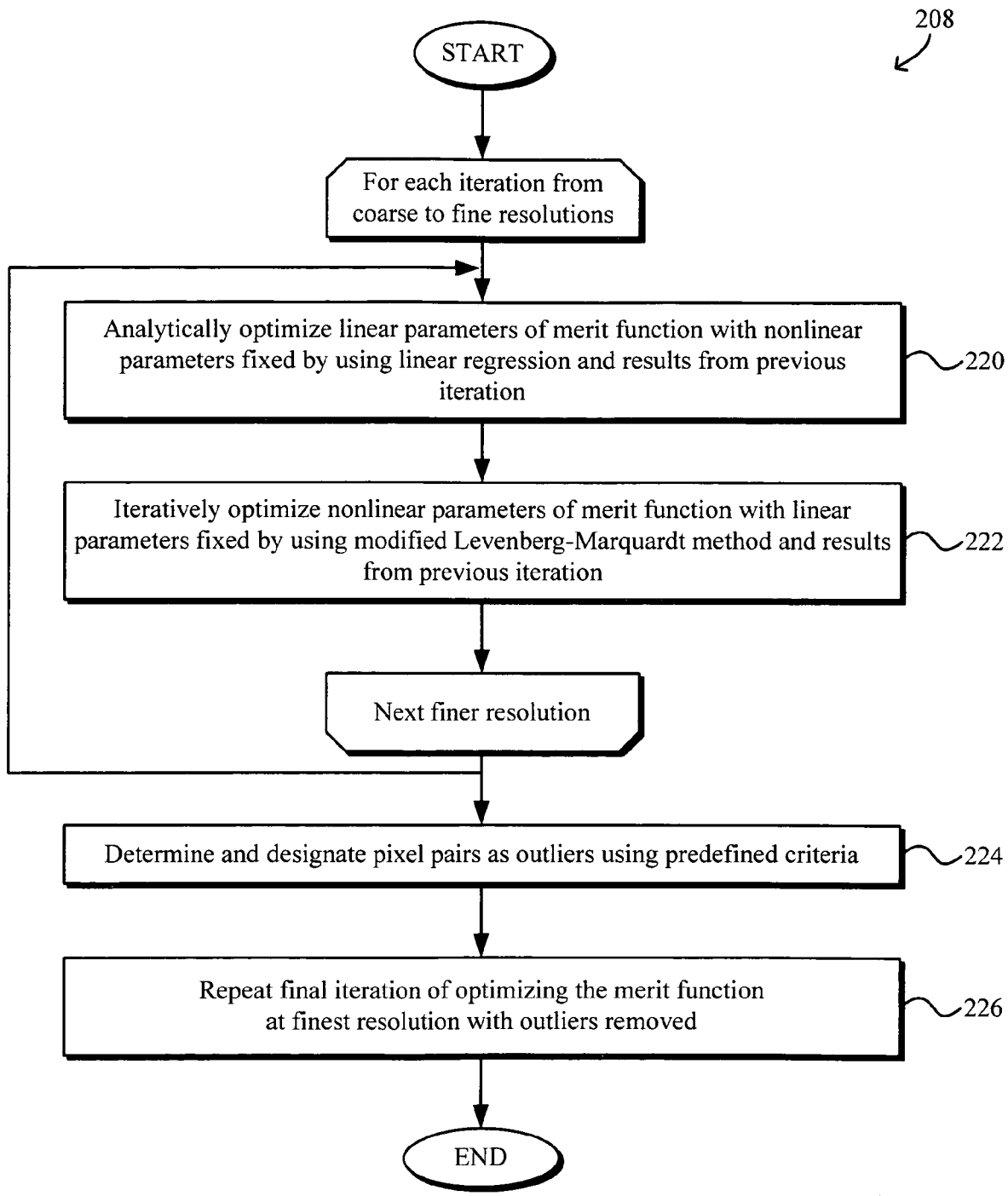
FIG. 3 is a flowchart illustrating in more detail a process for simultaneous geometric and grayscale registration by minimizing a merit function using an adapted Levenberg-Marquardt method to optimize parameter values for a geometric and grayscale transformation function.

The process 208 for optimizing the parameters of a simultaneous (e.g., concurrent) geometric and grayscale transformation function $T_{A,D}\{g_A[T_G(x_D)]\}$ using a merit or cost function is illustrated in more detail in the flowchart of FIG. 3. However, prior to describing process 208 in more detail, exemplary grayscale and geometric transformation models implemented in an illustrative merit function described infra are presented. In addition, an exemplary merit or cost function and minimization thereof to optimize parameter values for the geometric and grayscale transformation function are also presented below.

Geometric and Grayscale Transformation Model. The relationship between unprocessed digital data $g_D(x_{D,n})$ and analog data $g_A(x_{A,n})$ can be modeled by the following exemplary geometric and grayscale transformation model:

$$g_D(x_{D,n}) = T_{A,D}\{g_A[x_{A,n}]\} + \epsilon_n = T_{A,D}\{g_A[T_G(x_{D,n})]\} + \epsilon_n \quad (1)$$

where the terms of Eqn. (1) are summarized in TABLE1.

TABLE 1

| | |
|---|---|
| $x_{D,n}, x_{A,n} = T_G(x_{D,n})$ | Two-dimensional sample locations in the image planes |
| $T_G(x_{D,n})$ | Geometric transformation of the digital sample at location $x_{D,n}$ |
| $g_A(x_{A,n}), g_D(x_{D,n})$ | Normalized pixel values defined as $g_A(x_{A,n})$, $g_D(x_{D,n}) \in [0, 1]$ |
| $T_{A,D}(g_A[x_{A,n}])$ | Grayscale transformation from analog to digital |
| $\epsilon_n$ | Uncorrelated measurement errors |

Note that sample locations $x_{D,n}$ for the digital image D are generally located on a rectangular grid of the digital image while sample locations $x_{A,n}$ for the analog image A do not generally correspond with pixel locations. Thus, to obtain the normalized analog pixel values $g_A(x_{A,n})$ and gradients $\nabla_x g_A(x_{A,n})$, the analog image is typically modeled by a continuous function such as a bi-cubic spline or any of various other suitable functions. The grayscale transformation model from analog to digital $T_{A,D}(g_A[x_{A,n}])$ and from digital to analog $T_{A,D}^{-1}(g_D[x_{D,n}])$ as well as the geometric transformation model of the digital sample $T_G(x_{D,n})$ are described in more detail below.

Analog to Digital Grayscale Transformation Model. The digital to analog grayscale transformation $T_{A,D}(g_A[x_{A,n}])$ can be modeled by the following exemplary grayscale transformation model:

$$g_D(x_{D,n}) = T_{A,D}\{g_A(x_{A,n})\} = e^\lambda \left( \frac{1}{v - \phi g_A(x_{A,n})} - 1 \right)^\sigma, \quad (2)$$

where $\lambda$ is a real number, $\sigma$ is a negative real number, and $v$ and $\phi$ are positive real numbers ($\approx 1$). Note that if $v=\phi=1$, then the digitization of an analog image is optimal in that the dynamic range of the characteristic curve of the analog image is precisely digitized, e.g., the film curve is digitized from asymptote to asymptote. Pixel values with $v-g\phi \in [0,1]$ correspond to optical densities in the dynamic range of the characteristic curve while other pixel values, e.g., $v-g\phi<0$ or $v-g\phi>1$, should not exist. Thus, clipping of pixel values takes place when, according to the transformation $T_{A,D}$, $(v-g_A\phi)<0 \Rightarrow g_D \rightarrow 0$ or $(v-g_A\phi)>1 \Rightarrow g_D \rightarrow 1$. In other words, by incorporating digitization ranges, some pixel values may be invalid in the grayscale transformation model.

Digital to Analog Grayscale Transformation Model. The digital to analog grayscale transformation $T_{A,D}^{-1}(g_D[x_{D,n}])$, the inverse relation of $T_{A,D}(g_A[x_{A,n}])$, can be modeled by the following exemplary grayscale transformation model:

$$g_A(x_{A,n}) = T_{A,D}^{-1}\{g_D(x_{D,n})\} = \frac{1}{\phi}\left( v - \frac{1}{1 + e^{-\lambda} g_D^\sigma(x_{D,n})} \right), \quad (3)$$

where $\lambda = \lambda/\sigma$ is a real number and $\sigma = 1/\sigma$ is a negative real number.

As is evident, parameters $\lambda$, $\sigma$, $v$, and $\phi$ are the parameters of the grayscale transformation model (analog to digital or digital to analog). In this exemplary grayscale transformation model, $\lambda$, $\sigma$ are linear parameters and $v$ and $\phi$ are nonlinear parameters.

Geometric Transformation Model. The digital to analog geometric transformation $T_G(x_{D,n})$ can be modeled by the following exemplary geometric transformation model:

$$x_{A,n} = T_G(x_{D,n}) \quad (4)$$

$$= sR(\tau) \cdot (x_D - x_D^C) + t + x_D^C$$

$$= s \begin{pmatrix} \cos\tau & -\sin\tau \\ \sin\tau & \cos\tau \end{pmatrix} \cdot (x_D - x_D^C) + \begin{pmatrix} t_x \\ t_y \end{pmatrix} + x_D^C$$

where the parameters for the geometric transformation $T_G(x_{D,n})$ of the digital sample $x_{D,n}$ include isotropic scaling s, rotation $R(\tau)$ about a point $x_D^c$, and x and y translation $t_x$ and $t_y$, respectively. In this exemplary geometric transformation model, the parameters s, $\tau$, $t_x$, and $t_y$ are nonlinear parameters.

For purposes of clarity, the various parameters for the grayscale and geometric transformation models are summarized in TABLE II below.

TABLE II

| | |
|---|---|
| $\lambda, \sigma$ | compound parameters (linear parameters of grayscale transformation model) |
| $v, \phi$ | relative onset and size of digitization range (nonlinear parameters of grayscale transformation model) |
| s | isotropic scaling (nonlinear parameter of geometric transformation model) |
| $\tau$ | rotation (nonlinear parameter of geometric transformation model) |
| $t_x$ and $t_y$ | x and y translation (nonlinear parameters of geometric transformation model) |

Minimizing the Merit (Cost) Function: Sum of Squared Errors (SSE). A sum of squared errors (SSE) of log-exposures is utilized as the cost or merit function. The sum of squared errors is optimized or minimized in order to determine the optimal values of the parameter in the geometric and grayscale transformation model. For example, the sum of squared errors can be expressed as:

$$\chi^2 = \sum_n \frac{\{\ln g_D(x_{D,n}) - \ln T_{A,D}(g_A[T_G(x_{D,n})])\}^2}{\sigma_{stddev,n}^2} \quad (5)$$

$$= \sum_n \frac{\left\{\ln g_D(x_{D,n}) - \left[\lambda + \sigma\ln\left(\frac{1}{v - \phi g_A[T_g(x_{D,n})]} - 1\right)\right]\right\}^2}{\sigma_{stddev,n}^2}$$

Note that the summation $\Sigma_n$ is over pixels or locations in a mask M. As described above (with reference to block 204 in FIG. 2), masks $M_A$ and $M_D$ are determined the analog and digital images, respectively. The summation $\Sigma_n$ is over pixel locations in M where M={$(x_{D,n} \in M_D) \cap (x_{A,n} \in M_A)$}. In other words, M contains only the pixel pairs (after applying the geometric transformation for the current iteration) that are both labeled as target tissue. Thus, only valid pixel pairs, i.e., pixels or location in mask M, are taken into account for the given iteration of the merit function optimization process. Accordingly, as the mask M generally changes according to the geometric transformation setting for the given iteration (as the parameters for the geometric transformation portion of the transformation model are iteratively optimized), the number of pixels in M also changes in each iteration. To normalize the merit function for each iteration by the number of valid pixel-pairs in the current iteration, $\chi^2$ is divided by N, the number of elements that are summed. Herein, $\Sigma_n\{\}$ is used herein to refer to $(1/N)\Sigma_{n \in M}\{\}$.

The merit or cost function, e.g., the sum of squared errors $\chi^2$ of log-exposures, is minimized in order to determine the optimum values of the parameter for the geometric and grayscale transformation functions or models described above. In one exemplary embodiment, the merit function $\chi^2$ can be minimized using an adapted Levenberg-Marquardt method with linear regression as will be described in more detail below.

To efficiently minimize the merit function, a coarse-to-fine multi-scale or multi-resolution approach may be implemented using, for example, a Gaussian pyramid. As is known in the art, a Gaussian pyramid for an image is a sequence of copies of the image where each successive copy has half the resolution and sample rate. With the multi-scale approach, the optimal parameter values are determined by iteratively minimizing the merit function on a coarse scale to a fine scale, increasing the resolution with each iteration. On the coarse scale, relatively few data (pixel) samples are utilized to roughly determine the transformation between the two images. Each sampling may be an average of a group of neighboring pixels, for example. The registration or optimization is iteratively performed on finer and finer scales where each subsequent iteration uses the results of the previous iteration as input. Because finer details are not present on the coarser scales, the optimization process can thus avoid most local optima that are present in the original images at the coarser scales and increase computational speed as fewer iterations are needed to optimize the merit function on the finer, and much slower, scales. Merely as an example, with two images having, e.g., 1024×1024 pixel resolution, 10 iterations of the merit function minimization process may be performed (each iteration having some stop criterion) starting on a coarse scale of, e.g., 128×128, to the final iteration on a fine scale of, e.g., 512×512.

Referring again to FIG. 3, the process 208 for optimizing the parameters of the simultaneous (e.g., concurrent) geometric and grayscale transformation function $T_{A,D}\{g_A[T_G(x_D)]\}$ using a merit or cost function will now be described. At block 220, the linear parameters of the merit function are analytically optimized with nonlinear parameters fixed, e.g., using results from the previous iteration. For example, linear regression may be performed using results from the previous iteration (if applicable), to optimize the linear parameters. At block 222, the nonlinear parameters of the merit function are iteratively optimized with the linear parameters fixed, e.g., using results from the previous iteration. For example, a modified Levenberg-Marquardt method may be performed using results from the previous iteration (if applicable), to optimize the nonlinear parameters. The nonlinear parameters are optimized iteratively until a predefined stop criterion is reached. Thus the linear parameters have a closed form solution that depends on the nonlinear parameter values, e.g., from a previous iteration. Thus, in one iteration step, the linear parameters can be determined by linear regression. In the next iteration, the dependency of linear parameters on nonlinear parameters is taken into account in determining the next guess of nonlinear parameters. With such a configuration, the optimization can be performed more quickly and the capture range of parameters is larger. Blocks 220 and 222 are iteratively performed for increasingly finer resolutions in a multi-scale approach as described above.

After blocks 220 and 222 have been performed for the finest resolution, e.g., the original resolution of the images, outliers are determined and pixels pairs in the two images are designated as outliers using predefined criterion at block 224. Outliers are defined as points that are too far from the diagonal based on some predefined criterion, e.g., more than 2 to 3 times the standard deviation (or some predefined percentage or absolute range threshold) perpendicular from the diagonal for each given gray value. Thus, after the optimization of the merit function process is performed on the finest resolution, a joint histogram or joint distribution of pixel value pairs using the parametric results of the merit function minimization may be generated to identify outliers. The joint histogram provides a distribution of pixel value pairs from the two images, e.g., the analog image and the registered digital image. Ideally, all the mass of the joint histogram or distribution lies on a one-dimensional curve that represents a monotonically increasing (or decreasing) function. The one-dimensional curve generally describes the grayscale transformation $(g_A, T_{A,D}(g_A))$. In practice, however, the joint histogram has scattered mass around the ideal curve. This may be due to, for example, errors in geometric registration and/or physical changes that occurred between the times that the mammograms or other images are taken. The outliers in the joint histogram are identified using the predefined criterion and the pixel-value pairs in the two images corresponding to those identified outliers are marked as outliers at block 224.

At block 226, a final iteration of the merit function optimization process is performed, e.g., by performing the functions shown in blocks 220 and 222, at the finest resolution with the pixel value pairs of the identified outliers removed from the image data. In other words, the marked outlier locations are taken out and thus not involved in one final iteration of the merit function optimization on the finest resolution. This final iteration may be performed at the finest resolution previously performed using the results of the previous iteration as input. The optimization process for the parameter values of the geometric and grayscale transformation function for the two images is thus complete. It is noted that the removal of outliers generally improves the grayscale registration and generally does not affect the geometric registration much.

The merit function presented in Eqn. (5) above can be iteratively fitted or minimized to determine the optimal parameter values for the grayscale and geometric transformation model in a multi-scale approach as performed in blocks 220 and 222 and in the final optimization iteration in block 226 as described above with reference to FIG. 3. To better illustrate the process for optimizing the merit function iteratively in a multi-scale approach, the modified Levenberg-Marquardt method with linear regression as well as an overview of the standardized Levenberg-Marquardt method will be described in the following sections. In addition, an exemplary process for minimizing the merit function using the modified Levenberg-Marquardt method with linear regression is also presented below.

Modified Levenberg-Marquardt Method With Linear Regression for Minimizing Merit Function In one exemplary implementation, the parametric transformation model described herein is fitted to image data by employing the sum of squared errors (SSE) as the merit function which can be minimized to determine the optimal parameter values using a modified Levenberg-Marquardt method with linear regression. The modified Levenberg-Marquardt method with linear regression improves the computational speed by estimating fewer parameters in each iteration. In particular, the modified Levenberg-Marquardt method with linear regression splits the transformation model between linear and nonlinear parameters or terms and estimates the linear parameters directly using linear regression. The remaining nonlinear parameters are then estimated using the Levenberg-Marquardt method. The modified Levenberg-Marquardt method with linear regression thus obtains the minimum of the sum of squared errors (SSE) with respect to the linear parameters by fixing the nonlinear parameters. Once the nonlinear parameters are optimized, the linear parameters are also optimized.

Linear regression, as is known in the art, is a technique in which a straight line is fitted to a set of data points to determine the relationship between two random variables X and Y. The linear regression model postulates that Y=a+bX+e where the residual e is a random variable with a mean of zero. The coefficients a and b are determined by the condition that the sum of the square residuals is minimized.

To optimize the parameters, the sum of squared errors $\chi^2$ as provided in Eqn. (5) above can be minimized:

$$\chi^2(p) = \sum_n \frac{(y_n - y(x_n; p))^2}{\sigma_{stddev,n}^2} \quad (A1)$$

in which model y includes K linear terms with K coefficients b and K sub-models $z(x_n;a)$ with L coefficients a, to model nonlinear terms a. In other words, model y is defined as $y(x;a,b)=z(x;a)\cdot b$ with:

$$z(x; a) = \begin{pmatrix} z_1(x; a) \\ z_2(x; a) \\ \vdots \\ z_K(x; a) \end{pmatrix}^T, b = \begin{pmatrix} b_1 \\ b_2 \\ \vdots \\ bk \end{pmatrix}$$

$$p = \begin{pmatrix} a \\ b \end{pmatrix} \quad ((K+L) \text{ vector})$$

In the exemplary geometric and grayscale transformation models described above, K=2 (linear parameters $\lambda$ and $\sigma$ from the exemplary grayscale transformation model) and L=4 (nonlinear parameters s, $\tau$, $t_x$, and $t_y$ and nonlinear parameters $\nu$ and $\phi$ from the exemplary geometric and grayscale transformation models, respectively). Y and Z are defined as an N-vector and an N×K matrix, respectively:

$$Y = \begin{pmatrix} y_1/\sigma_1 \\ y_2/\sigma_2 \\ \vdots \\ y_N/\sigma_N \end{pmatrix}, \text{ and}$$

$$Z = \begin{pmatrix} z_1(x_1; a)/\sigma_1 & z_2(x_1; a)/\sigma_1 & \cdots & z_K(x_1; a)/\sigma_1 \\ z_1(x_2; a)/\sigma_2 & z_2(x_2; a)/\sigma_2 & \cdots & z_K(x_2; a)/\sigma_2 \\ \vdots & \vdots & \ddots & \vdots \\ z_1(x_N; a)/\sigma_N & z_2(x_N; a)/\sigma_N & \cdots & z_K(x_N; a)/\sigma_N \end{pmatrix}.$$

The sum of squared errors $\chi^2$ from Eqn. (A1) above can then be rewritten in matrix notation:

$$\chi^2(a, b) = \sum_n \frac{(y_n - z(x_n; a) \cdot b)^2}{\sigma_{stddev,n}^2} = (Y - Z \cdot b)^2 \quad (A2)$$

As noted above, the modified Levenberg-Marquardt method with linear regression splits the transformation model between linear and nonlinear parameters and estimates the linear parameters directly using linear regression to improve the computational speed by estimating fewer parameters in each iteration. The modified Levenberg-Marquardt method with linear regression thus obtains the minimum of the sum of squared errors (SSE) with respect to the linear parameters by fixing the nonlinear parameters. Linear regression is performed on the linear parameter vector b as follows:

$$\nabla_b \chi^2(a,b) = 0 \Rightarrow \overline{b} = (Z^T \cdot Z)^{-1} \cdot (Z^T \cdot Y) \quad (A3)$$

Substituting $\overline{b}$ in the sum of squared errors $\chi^2(a,b)$ in Eqn. (A2) above gives:

$$\overline{\chi}^2(a) = \chi^2(a, \overline{b}) \quad (A4)$$
$$= Y^T \cdot (I - Z \cdot (Z^T \cdot Z)^{-1} \cdot Z^T) \cdot Y$$
$$= (Y^T \cdot Y) - \overline{b}^T \cdot (Z^T \cdot Z) \cdot \overline{b} \quad (\text{by } (Z^T \cdot Y) = (Z^T \cdot Z) \cdot \overline{b})$$
$$= (Y^T \cdot Y) - (Y^T \cdot Z) \cdot \overline{b}.$$

Thus, instead of K linear parameters a plus L parameters b, only L nonlinear parameters a need to be estimated by minimizing $\overline{\chi}^2(a)$. In particular, if the sample sums are defined as:

$$\begin{cases} \sum_{y,y} = Y^T \cdot Y & \text{(scalar)} \\ \sum_{z,y} = Z^T \cdot Y & (K \text{ vector}) \\ \sum_{z,z} = Z^T \cdot Z & (K \times K \text{ matrix}) \end{cases}$$

then $$\overline{b} = \sum_{z,z}^{-1} \cdot \sum_{z,y} \quad (A5)$$

$$\overline{\chi}^2(a) = \sum_{y,y} - \sum_{z,y}^T \cdot \sum_{z,z}^{-1} \cdot \sum_{z,y}$$
$$= \sum_{y,y} - \overline{b}^T \cdot \sum_{z,z} \cdot \overline{b} \quad \text{by} \left(\sum_{z,y} = \sum_{z,z} \cdot \overline{b}\right)$$
$$= \sum_{y,y} - \overline{b}^T \cdot \sum_{z,y}$$

The Newton-Raphson portion of the Levenberg-Marquardt method will now be described with reference to Eqn. (A6) below. The Newton-Raphson or Newton's method, as is known in the art, is a root-finding algorithm that uses the first few terms of the Taylor series of a function $\zeta(x)$ in the vicinity of a suspected root. In particular, in the Newton-Raphson method, given the equation $\zeta(x)=0$ and an initial approximation, $x_0$, a better approximation is given by: $x(i+1)=x(i)-[\zeta(x(i))/\zeta'((x(i))]$ where $\zeta'((x)$ is the first derivative of $\zeta(x)$, i.e., $\zeta'((x)=df/dx$. Thus, using the Newton-Raphson method, $\overline{\chi}^2(a)$ can be approximated around the parameters $a_c$ of the current trial by the expansion:

$$\overline{\chi}^2(a) \approx \overline{\chi}^2(a_c) - 2\beta^T \cdot (a-a_c) + (a-a_c)^T \cdot \alpha \cdot (a-a_c)$$

where $\alpha$ is an L×L matrix and $\beta$ is an L vector. If the above approximation is valid, then starting from the current trial $a_c$ to the minimum of $\overline{\chi}^2(a)$ at $\overline{a}$ can be achieved in a single step by:

$$\overline{a} = a_c + da = a_c + \alpha^{-1} \cdot \beta \quad (A6)$$

Next, the gradients $\beta = -(\frac{1}{2})\nabla_a \overline{\chi}^2(a_c)$ and the approximated curvature matrix $\alpha = (\frac{1}{2})(\nabla_a \cdot \nabla_a)\overline{\chi}^2(a_c)$ are calculated. The calculation of the approximated curvature matrix may deviate somewhat from the standard Levenberg-Marquardt method because not only are the nonlinear parameters a explicitly present in $\overline{\chi}^2(a) = \chi^2(a, \overline{b})$, but the linear regression parameters $\overline{b}$ are also implicitly present therein. Except for the calculations of the gradients $\beta$ and the approximated curvature matrix $\alpha$, the adapted Levenberg-Marquardt method is otherwise generally the same as the standard Levenberg-Marquardt method, i.e., regularization between the Steepest Descent method and the Newton-Raphson method, as are known in the art. Note that, as is known in the art, the Steepest Descent method is an algorithm that numerically approximates a local minimum by starting with one point using the gradient method. An overview of the standard Levenberg-Marquardt method is described, infra.

The gradients or partial derivatives $\beta = -(\frac{1}{2})\nabla_a \overline{\chi}^2(a_c)$, where the constant $(-\frac{1}{2})$ is merely a convention, can be given by:

$$\beta_i = -\frac{1}{2}\frac{\partial \overline{\chi}^2(a)}{\partial a_i}$$

$$= -\frac{1}{2}\frac{\partial \chi^2(a,b)}{\partial a_i}\bigg|_{b=\overline{b}} - \frac{1}{2}[\nabla_b \chi^2(a,\overline{b})]^T \cdot \frac{\partial \overline{b}}{\partial a_i}$$

As $\overline{b}$ was obtained by solving $\nabla_b \chi^2(a,b) = 0$, the second term in the equation above is 0, and thus the gradients or partial derivatives $\beta$ become:

$$\beta_i = \overline{b}^T \cdot \frac{\partial Z^T}{\partial a_i} \cdot (Y - Z \cdot \overline{b}) \quad (A7)$$

By collecting all terms $Y - Z \cdot \overline{b}$, the approximated curvature matrix or the second derivatives $\alpha$ can be obtained:

$$\alpha_{i,j} = \frac{1}{2}\frac{\partial^2 \overline{\chi}^2(a)}{\partial a_i \partial a_j} = -\frac{\partial \beta_i}{\partial a_j} = -\frac{\partial}{\partial a_j}\left[\overline{b}^T \cdot \frac{\partial Z^T}{\partial a_i} \cdot (Y - Z \cdot \overline{b})\right]$$

$$= (\ldots) \cdot (Y - Z \cdot \overline{b}) + \overline{b}^T \cdot \frac{\partial Z^T}{\partial a_i} \cdot (I - Z \cdot (Z^T \cdot Z)^{-1} \cdot Z^T) \cdot \frac{\partial Z}{\partial a_j} \cdot \overline{b}$$

If the model is valid, then $Y - Z \cdot \overline{b}$ are random residual errors that are relatively independent of the model. Points $x_i$ that are close to each other have similar function values and partial derivatives and summations containing $Y - Z \cdot \overline{b}$ go to 0 for large N as the residual errors tend to cancel out. The assumption or premise that the sum of the residual error terms tend to be small and thus cancel out is used again below. Thus, for similar reasons as in Numerical Recipes as known in the art, only the final term in the equation for the curvature matrix or second derivatives $\alpha$ above remains:

$$\alpha_{i,j} \approx \overline{b}^T \cdot \frac{\partial Z^T}{\partial a_i} \cdot (I - Z \cdot (Z^T \cdot Z)^{-1} \cdot Z^T) \cdot \frac{\partial Z}{\partial a_j} \cdot \overline{b} \quad (A8)$$

Once Eqn. (A1) for the sum of squared errors $\chi^2(p)$ is optimized (minimized), the covariance matrix A of the estimated parameters can be obtained as the inverse of the curvature matrix. In particular, the $(K+L \times K+L)$ covariance matrix, denoted by A, is split into four parts:

$$A = \begin{pmatrix} A_{a,a} & A_{a,b} \\ A_{a,b}^T & A_{b,b} \end{pmatrix} = \frac{1}{2}\nabla_p^2 \chi^2(\overline{a}, \overline{b}) = \frac{1}{2}\nabla_p^2 (Y - Z \cdot \overline{b})^2 \quad (A9)$$

The linear portion of the covariance matrix, $A_{b,b}$, a $K \times K$ matrix, is given by:

$$A_{b,b} = \frac{1}{2}\nabla_b^2 \chi^2(\overline{a}, \overline{b}) = Z^T \cdot Z = \sum_{z,z} \quad (A10)$$

The combined linear/nonlinear portion of the covariance matrix, $A_{a,b}$, an $L \times K$ matrix, again using the assumption that the sums of the residual error terms tend to cancel out, is given by:

$$(A_{a,b})_{i,k} = \frac{1}{2}\frac{\partial^2}{\partial a_k \partial b_k}\left[(Y - Z \cdot \overline{b})^2\right] \quad (A11)$$

$$= \frac{\partial}{\partial b_k}\left[\overline{b}^T \cdot \frac{\partial Z^T}{\partial a_i} \cdot (Y - Z \cdot \overline{b})\right]$$

$$= \overline{b}^T \cdot \left(\frac{\partial Z^T}{\partial a_i} \cdot Z \cdot \hat{e}_k\right) - \hat{e}_k^T \cdot \frac{\partial Z^T}{\partial a_i} \cdot (Y - Z \cdot \overline{b})$$

$$\approx \overline{b}^T \cdot \left(\frac{\partial Z^T}{\partial a_i} \cdot Z \cdot \hat{e}_k\right) = \overline{b}^T \cdot \sum_{\partial z, z}^{i} \cdot \hat{e}_k,$$

where $i \in \{1, 2, \ldots, L\}$ and $k \in \{1, 2, \ldots, K\}$.

The nonlinear portion of the covariance matrix, $A_{a,a}$, an $L \times L$ matrix, is given by:

$$(A_{a,a})_{i,j} = \overline{b}^T \cdot \left(\frac{\partial Z^T}{\partial a_i} \cdot \frac{\partial Z}{\partial a_j}\right) \cdot \overline{b} - \overline{b}^T \cdot \frac{\partial^2 Z^T}{\partial a_i \partial a_j} \cdot (Y - Z \cdot \overline{b}) \quad (A12)$$

$$\approx \overline{b}^T \cdot \left(\frac{\partial Z^T}{\partial a_i} \cdot \frac{\partial Z}{\partial a_j}\right) \cdot \overline{b} = \overline{b}^T \cdot \sum_{\partial Z, \partial Z}^{i,j} \cdot \overline{b},$$

where $i, j \in \{1, 2, \ldots, L\}$.

Combining Eqns. (A9), (A10), (A11), and (A12) for the four portions of the covariance matrix A above results in the following approximated curvature matrix A:

$$A \approx \begin{pmatrix} mtx_{L,L}\left\{\overline{b}^T \cdot \sum_{\partial z, \partial z}^{i,j} \cdot \overline{b}\right\} & mtx_{L,K}\left\{\overline{b}^T \cdot \sum_{\partial z, z}^{i} \cdot \hat{e}_k\right\} \\ mtx_{L,K}\left\{\overline{b}^T \cdot \sum_{\partial z, z}^{i} \cdot \hat{e}_k\right\}^T & \sum_{z,z} \end{pmatrix} \quad (A13)$$

where $i, j \in \{1, 2, \ldots, L\}$ and $k \in \{1, 2, \ldots, K\}$.

A summary of sample sums and the main results for the modified Levenberg-Marquardt method with linear regression are provided below. In particular, the sample sums for the modified Levenberg-Marquardt method with linear regression are as summarized below:

$$\begin{cases} \sum_{y,y} = Y^T \cdot Y & \text{(scalar)} \\ \sum_{z,y} = Z^T \cdot Y & (K\text{-vector}) \\ \sum_{z,z} = Z^T \cdot Z & (K \times K \text{ matrix}) \\ \sum_{\partial z,y}^{i} = \frac{\partial Z^T}{\partial a_i} \cdot Y & i \in \{1, 2, \ldots, L\} \quad (K\text{-vector}) \\ \sum_{\partial z,z}^{i} = \frac{\partial Z^T}{\partial a_i} \cdot Z & i \in \{1, 2, \ldots, L\} \quad (K \times K \text{ matrix}) \\ \sum_{\partial z,\partial z}^{i,j} = \frac{\partial Z^T}{\partial a_i} \cdot \frac{\partial Z}{\partial a_j} & i, j \in \{1, 2, \ldots, L\} \quad (K \times K \text{ matrix}) \end{cases}$$

Substituting the above sample sums into each of Eqns. (A3), (A4), (A7), (A8) and (A13), the main results for modified Levenberg-Marquardt the method with linear regression are summarized below:

$$\bar{b} = \sum_{z,z}^{-1} \cdot \sum_{z,y} \qquad \text{(from Eqn. (A3))}$$

$$\bar{\chi}^2(a) = \sum_{y,y} -\bar{b}^T \cdot \sum_{z,y} \qquad \text{(from Eqn. (A4))}$$

$$\beta_i = \bar{b}^T \cdot \left( \sum_{\partial z,y}^{i} - \sum_{\partial z,z}^{i} \cdot \bar{b} \right) \qquad \text{(from Eqn. (A7))}$$

$$\alpha_{i,j} \approx \bar{b}^T \cdot \left( \sum_{\partial Z,\partial Z}^{i,j} - \sum_{\partial Z,Z}^{i} \cdot \sum_{Z,Z}^{-1} \cdot \left( \sum_{\partial Z,Z}^{j} \right)^T \right) \cdot \bar{b} \qquad \text{(from Eqn. (A8))}$$

$$A \approx \begin{pmatrix} mtx_{L,L}\left\{\bar{b}^T \cdot \sum_{\partial z,\partial z}^{i,j} \cdot \bar{b}\right\} & mtx_{L,K}\left\{\bar{b}^T \cdot \sum_{\partial z,z}^{i} \cdot \hat{e}_k\right\} \\ mtx_{L,K}\left\{\bar{b}^T \cdot \sum_{\partial z,z}^{i} \cdot \hat{e}_k\right\}^T & \sum_{z,z} \end{pmatrix} \qquad \text{(from Eqn. (A13))}$$

where $i, j \in \{1, 2, \ldots, L\}$ and $k \in \{1, 2, \ldots, K\}$.

As noted, each iteration of the modified Levenberg-Marquardt method with linear regression uses the output of the prior iteration as input. Thus, the sum of squared errors (SSE) with prior information can be given by:

$$\chi^2(a,b) = (Y - Z \cdot b)^2 + (a - a_0)^T \cdot V_{a,a} \cdot (a - a_0)$$

where $V_{a,a}$ is twice the inverse of the covariance matrix of priors $a_0$. The prior information or results, e.g., from prior iterations, can be updated as follows:

$$\bar{b} \rightarrow \bar{b} \qquad \text{(update in Eqn. (A3))}$$

$$\bar{\chi}^2(a) \rightarrow \bar{\chi}^2(a) + (a - a_0)^T \cdot V_{a,a} \cdot (a - a_0) \qquad \text{(update in Eqn. (A4))}$$

$$\beta \rightarrow \beta - V_{a,a} \cdot (a - a_0) \qquad \text{(update in Eqn. (A7))}$$

$$\alpha \rightarrow \alpha + V_{a,a} \qquad \text{(update in Eqn. (A8))}$$

$$A \rightarrow A + \begin{pmatrix} V_{a,a} & 0 \\ 0 & 0 \end{pmatrix} \qquad \text{(update in Eqn. (A13))}$$

The remainder of the equations remains unchanged.

Standard Levenberg-Marquardt Method

Prior to describing the optimization of the merit function using the modified Levenberg-Marquardt method with linear regression, an overview of the standard Levenberg-Marquardt method is first provided. As is known in the art, the Levenberg-Marquardt method is a popular alternative to the Gauss-Newton method for findings the minimum of a function that is a sum of squares of nonlinear functions. In the standard Levenberg-Marquardt method, the sum of squared errors $\chi^2(a, b)$, the gradients or partial derivatives $\beta$, and the approximated curvature matrix $\alpha$ are as follows:

$$\chi^2(a, b) = \sum_{y,y} -2b^T \cdot \sum_{z,y} + b^T \sum_{z,z} \cdot b$$

$$\beta = \begin{pmatrix} vec_L\left\{b^T \cdot \left(\sum_{\partial z,y}^{i} - \sum_{\partial z,z}^{i} \cdot b\right)\right\} \\ \sum_{z,y} - \sum_{z,z} \cdot b \end{pmatrix}$$

$$\alpha \approx \begin{pmatrix} mtx_{L,L}\left\{b^T \cdot \sum_{\partial z,\partial z}^{i,j} \cdot b\right\} & mtx_{L,K}\left\{b^T \cdot \sum_{\partial z,z}^{i} \cdot \hat{e}_k\right\} \\ mtx_{L,K}\left\{b^T \cdot \sum_{\partial z,z}^{i} \cdot \hat{e}_k\right\}^T & \sum_{z,z} \end{pmatrix}$$

where $i, j \in \{1, 2, \ldots, L\}$ and $k \in \{1, 2, \ldots, K\}$. Compared to the main results generated from Eqns. (A3), (A4), (A7), (A8) and (A13) as summarized above for the adapted Levenberg-Marquardt method with linear regression, the above equations for the standard Levenberg-Marquardt method show that the same sums are computed, i.e., the same computational costs. However, more parameters are estimated such that more iterations are likely required.

Figure 4:
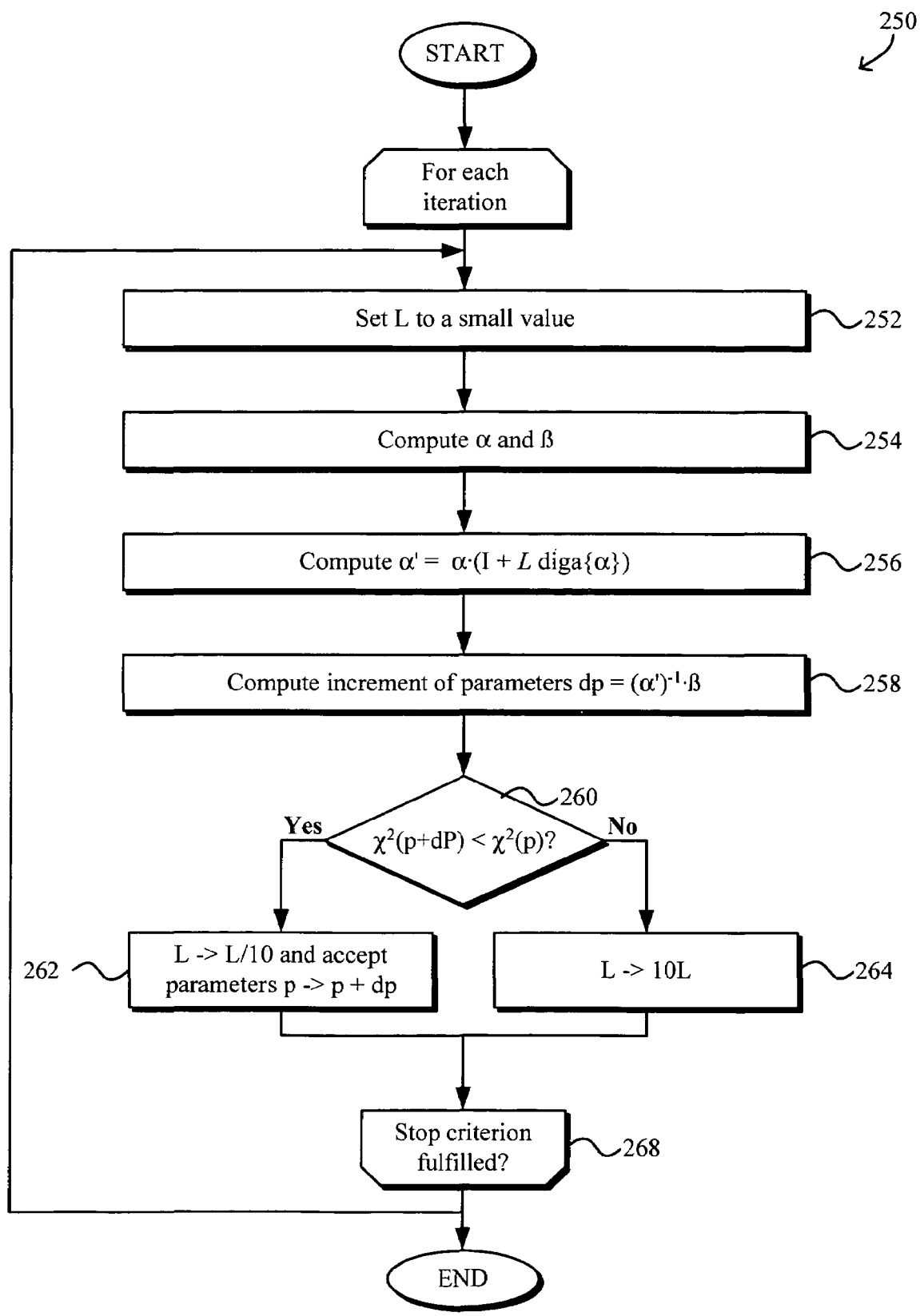
FIG. 4 is a flowchart illustrating an exemplary implementation of the Levenberg-Marquardt method.

If L is a regularization parameter that balances the Steepest Descent method (L→∞) and the Newton-Raphson method (L=0), then the standard Levenberg-Marquardt method generally works as shown in FIG. 4. In particular, FIG. 4 is a flowchart illustrating an exemplary implementation of the standard Levenberg-Marquardt method 250. In particular, at block 252, L is set to a small value, e.g., L=0.001. At block 254, the approximated curvature matrix a and the gradients or partial derivatives $\beta$ are computed. At block 256, $\alpha' = \alpha \cdot (I + L \operatorname{diga}\{\alpha\})$ is computed. At block 258, the increment of parameters $dp = (\alpha')^{-1} \cdot \beta$ is computed. If $\chi^2(p+dP) < \chi^2(p)$ as determined at decision block 260, then at block 262, L is set as L→L/10 (or some other substantial value) and the parameters p→p+dp are accepted. Alternatively, if $\chi^2(p+dP) > \chi^2(p)$, then at block 264, L is set as L→10 L. If the stop criterion (as described below) is not fulfilled as determined at block 268, then the Levenberg-Marquardt method 250 returns to block 252 to perform another iteration.

Several exemplary stop criteria for the Levenberg-Marquardt method are provided below that can be implemented separately or in combination:

1. Improvement of $\chi^2$ in subsequent iterations steps, e.g., $$\left|1 - \frac{\chi^2(p)}{\chi^2(p+dp)}\right|$$

2. Values of the gradients β (compared to zeros), e.g., |β|.
3. Values of the increments in parameters dp (compared to zeros), e.g., |dp|.

Optimizing the Merit Function Using Modified Levenberg-Marquardt Method With Linear Regression Applying the results from above, the merit (cost) function is fitted or minimized. As described above, the sum of squared errors $\chi^2$ of log-exposures as given in Eqn.(5) above is minimized (optimized) to determine optimal values of the parameters. In one exemplary embodiment, $\chi^2$ can be minimized by an adapted Levenberg-Marquardt minimization method as described above. In implementing the Levenberg-Marquardt minimization method, two functions $y_n$ and $\Lambda_n$ can be defined as follows:

$$y_n = \ln g_D(x_{D,n}), \quad (6)$$

$$\Lambda_n = \ln\left(\frac{1}{v - \phi g_A[T_G(x_{D,n})]} - 1\right). \quad (7)$$

In addition, with the exemplary geometric and grayscale transformation models as described above, the nonlinear a and linear parameters b are:

$$a = \begin{pmatrix} v \\ \phi \\ \tau \\ t_x \\ t_y \\ s \end{pmatrix}; b = \begin{pmatrix} \lambda \\ \sigma \end{pmatrix}. \quad (8)$$

As is evident, in the exemplary embodiment, there are six (6) nonlinear and two (2) linear parameters. However, it is to be understood that various other suitable combinations nonlinear and linear parameters may be employed. The sample sums of the standard Levenberg-Marquardt method as presented above thus become:

| | Number of summations to be computed |
|---|---|
| Degrees of Freedom: | 6   4   2   0 |
| $\sum_{y,y} = \sum_n \frac{y_n^2}{\sigma_{stddev,n}^2}$ | 1   1   1   1 |
| $\sum_{z,y} = \begin{pmatrix} \sum_n \frac{y_n}{\sigma_{stddev,n}^2} \\ \sum_n \frac{\Lambda_n y_n}{\sigma_{stddev,n}^2} \end{pmatrix}$ | 2   2   2   2 |
| $\sum_{z,z} = \begin{pmatrix} \sum_n \frac{1}{\sigma_{stddev,n}^2} & \sum_n \frac{\Lambda_n}{\sigma_{stddev,n}^2} \\ \sum_n \frac{\Lambda_n}{\sigma_{stddev,n}^2} & \sum_n \frac{\Lambda_n^2}{\sigma_{stddev,n}^2} \end{pmatrix}$ | 3   3   3   3 |
| $\sum_{\partial z,y}^{i} = \begin{pmatrix} 0 \\ \sum_n \frac{[\partial \Lambda_n / \partial a_i] y_n}{\sigma_{stddev,n}^2} \end{pmatrix}$ | 6   4   2   0 |
| $\sum_{\partial z,y}^{i} = \begin{pmatrix} \sum_n \frac{[\partial \Lambda_n / \partial a_i]}{\sigma_{stddev,n}^2} & 0 \\ & \sum_n \frac{[\partial \Lambda_n / \partial a_i]\Lambda_n}{\sigma_{stddev,n}^2} \end{pmatrix}$ | 12   8   4   0 |
| $\sum_{\partial z,\partial z}^{i,j} = \begin{pmatrix} 0 & 0 \\ 0 & \sum_n \frac{[\partial \Lambda_n / \partial a_i][\partial \Lambda_n / \partial a_j]}{\sigma_{stddev,n}^2} \end{pmatrix}$ | 21   10   3   0 |
| Total number of summations to be computed: | 45   28   15   6 | where i, j ∈ {1, 2, ..., 6}. The number of summations to be computed for the various degrees of freedom of the nonlinear parameters a are listed to the right of each summation. For example, if all 6 nonlinear parameters are fitted, then 45 summations are updated while traversing the digital grid. If $\sigma_n$ does not depend on the transformation, then $\Sigma_{y,y}$ and the first component of $\Sigma_{z,y}$ can be pre-computed. Note that the derivatives of $\Lambda()$ are given infra.

Note that alternative definitions of the sample summations may be utilized, for example:

$$s_0 = \sum_n \frac{1}{\sigma^2_{stddev,n}}, \quad s_{y,y} = \sum_n \frac{y_n^2}{\sigma^2_{stddev,n}}, \quad s_{\partial z} = \sum_n \frac{\nabla_a \Lambda_n}{\sigma^2_{stddev,n}},$$

$$s_y = \sum_n \frac{y_n}{\sigma^2_{stddev,n}}, \quad s_{z,y} = \sum_n \frac{\Lambda_n y_n}{\sigma^2_{stddev,n}}, \quad s_{\partial z,y} = \sum_n \frac{(\nabla_a \Lambda_n) y_n}{\sigma^2_{stddev,n}},$$

$$s_z = \sum_n \frac{\Lambda_n}{\sigma^2_{stddev,n}}, \quad s_{z,z} = \sum_n \frac{\Lambda_n^2}{\sigma^2_{stddev,n}}, \quad s_{\partial z,z} = \sum_n \frac{(\nabla_a \Lambda_n) \Lambda_n}{\sigma^2_{stddev,n}},$$

$$s_{\partial z, \partial z} = \sum_n \frac{(\nabla_a \Lambda_n) \cdot (\nabla_a \Lambda_n)^T}{\sigma^2_{stddev,n}}.$$

If the sample sums $\Sigma_{y,y}$, $\Sigma_{z,y}$, $\Sigma_{z,z}$, etc., above are substituted in the results generated from Eqns. (A3), (A4), (A7), (A8) and (A13) as summarized above, then:

$$\overline{b} = \frac{1}{s_0 s_{z,z} - s_z^2} \begin{pmatrix} s_{z,z} s_y - s_z s_{z,y} \\ s_0 s_{z,y} - s_z s_y \end{pmatrix}$$

$$\overline{\chi}^2(a) = s_{y,y} - \overline{b}_1 s_y - \overline{b}_2^2 s_{z,y}$$

$$\beta = \overline{b}_2 \cdot s_{\partial z,y} - \overline{b}_1 \overline{b}_2 \cdot s_{\partial z} - \overline{b}_2^2 s_{\partial z,z}$$

$$\alpha \approx \overline{b}_2^2 \left[ s_{\partial z, \partial z} - \frac{s_{z,z}(s_{\partial z} \cdot s_{\partial z}^T) + s_0(s_{\partial z,z} \cdot s_{\partial z,z}^T) -}{s_0 s_{z,z} - s_z^2} \right]$$

$$A \approx \begin{pmatrix} \overline{b}_2^2 s_{\partial z, \partial z} & \overline{b}_2(s_{\partial z} \ s_{\partial z,z}) \\ \overline{b}_2 \begin{pmatrix} s_{\partial z}^T \\ s_{\partial z,z}^T \end{pmatrix} & \begin{pmatrix} s_0 & s_z \\ s_z & s_{z,z} \end{pmatrix} \end{pmatrix}$$

The gradients of the nonlinear portion of the model in Eqn. (7) above can be calculated:

$$\Lambda(x_D; a) = \ln\left( \frac{1}{v - \phi g_A [T_G(x_D)]} - 1 \right) \quad \text{(from Eqn. (7))}$$

If $\Omega$ is defined as the relative optical densities relative to the asymptotes of the film curve:

$$\Omega = v - \phi g_A [T_G(x_D)] \quad (9)$$

$$= v - \phi g_A [sR(\tau) \cdot (x_D - x_D^c) + t + x_D^c] \quad \text{(by Eqn. (4))}$$

then gradients of the nonlinear portion of the model in Eqn. (7) above are as follows:

$$\begin{cases} \Lambda = \ln\left(\frac{1}{\Omega} - 1\right) \\ \frac{\partial \Lambda}{\partial v} = -\frac{1}{\Omega(1-\Omega)} \\ \frac{\partial \Lambda}{\partial \phi} = +\frac{g_A}{\Omega(1-\Omega)} \\ \frac{\partial \Lambda}{\partial \tau} = +\frac{\phi s}{\Omega(1-\Omega)} \begin{pmatrix} g_{A,x} \\ g_{A,y} \end{pmatrix}^T \cdot \begin{pmatrix} -\sin\tau & -\cos\tau \\ \cos\tau & -\sin\tau \end{pmatrix} \cdot (x_D - x_D^c) \\ \frac{\partial \Lambda}{\partial t_x} = +\frac{\phi g_{A,x}}{\Omega(1-\Omega)} \\ \frac{\partial \Lambda}{\partial t_y} = +\frac{\phi g_{A,y}}{\Omega(1-\Omega)} \\ \frac{\partial \Lambda}{\partial s} = +\frac{\phi}{\Omega(1-\Omega)} \begin{pmatrix} g_{A,x} \\ g_{A,y} \end{pmatrix}^T \cdot \begin{pmatrix} \cos\tau & -\sin\tau \\ \sin\tau & \cos\tau \end{pmatrix} \cdot (x_D - x_D^c) \end{cases} \quad (10)$$

As is evident, the methods described herein provide simultaneous geometric and grayscale (pixel-value) registration of two or more images by minimization of the sum of squared errors (SSE) of pixel-values. When the methods are used to register film-based and digital images, a theoretically derived transformation model between the film-based and digital image, e.g., mammograms, can be employed. For example, the transformation model may include parameters for the characteristic film curve and digitization for film-based images or detector response for unprocessed digital images. However, the methods can be used to register any combination of film-based, digital and/or other images.

As noted, in determining the optimum parameter values for the transformation model, a sum of squared errors can be used as the merit or cost function and minimized using data from the two images. Optimal parameter values can be estimated by minimizing a merit or cost function using, for example, an adapted Levenberg-Marquardt method with linear regression. To provide computational efficiency, the parameters of the transformation model for the simultaneous geometric and grayscale registration of the images can be split between linear and nonlinear parameters. In particular, gradient information with respect to the transformation parameters can be used in the optimization process to improve the computational speed with relatively small extra cost per iteration step as the gradient facilitates in locating the optimum (minimum) of the merit function. In one embodiment, the linear parameters can be estimated using linear regression in each iteration step to improve the nonlinear parameters.

Once the optimum values for the parameters of the registration model are estimated or otherwise determined, the actual registration of the images generally involves either using the transform function and/or a transform lookup table resulting from the optimization process to transform and register pixel values of one image to the pixel values of the other image. The resulting images are thus registered both geometrically and in grayscale. These methods are particularly suited for temporal comparisons of medical images such as mammograms. The transformation methods greatly facilitate comparison of analog and digital images, e.g., combinations of unprocessed digital and digitized film-based mammograms by a radiologist. For example, the methods enable radiologists to make quick, effective and efficient temporal comparisons of medical images and thus requiring fewer manual and subjective adjustments to be made by the radiologists for optimal display of the mammograms. In addition or alternative to image display, the methods may also be used for computer aided detection methods that make use of temporal or other comparative information.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method implemented by a computing device comprising at least one processor and memory for registration of a first image and a second image, the first and second images being medical images in digital form of one of a same body part and respective corresponding body parts, the method comprising:
   acquiring, by the computing device, the first and second images from a computer readable image memory;
   optimizing, by the computing device, a merit function containing a plurality of parameters associated with a transformation function for simultaneous geometric and grayscale registering of the first and second images relative to each other, the optimizing of the merit function being performed by determining optimal values of the parameters using data in the first and second images; and registering, by the computing device, the first image to the second image by applying the geometric and grayscale transformation function using the optimal values of the parameters to generate a third image, the third image being transformed from the first image and registered to the second image; and performing, by the computing device, at least one of the steps of:

(i) outputting said second and third images to a display device, and (ii) processing said second and third images according to an automated anatomical abnormality detection algorithm and outputting at least one result thereof in digital form to a destination computer readable memory.

2. The method of claim 1, wherein said plurality of parameters includes (i) at least one grayscale mapping parameter corresponding to a predetermined model of medical image acquisition associated with said first and second images, and (ii) at least one geometric mapping parameter corresponding to a predetermined model of a geometrical relationship between said first and second images.

3. The method of claim 2, wherein said first and second images are mammograms, and wherein said predetermined model of medical image acquisition associated with said first and second images is selected from the group consisting of: a first model in which the first image is a digitized analog mammogram and the second image is a digitized analog mammogram; a second model in which the first image is a digitized analog mammogram and the second image is a digitally acquired mammogram; a third model in which the first image is a digitally acquired mammogram and the second image is a digitized analog mammogram; and a fourth model in which the first image is a digitally acquired mammogram and the second image is a digitally acquired mammogram.

4. The method of claim 2, wherein said predetermined model of the geometric relationship between said first and second images models is characterized by an isotropic scaling, a rotation about a point, and a lateral translation.

5. The method of claim 1, wherein the optimizing includes iteratively performing an optimization process from a coarse resolution to a fine resolution of the images.

6. The method of claim 5, wherein each iterative optimization process utilizes results from a previous iteration.

7. The method of claim 5, wherein the parameters include at least one linear parameter and at least one nonlinear parameter and wherein each iterative optimization process includes:

optimizing each linear parameter of the merit function while fixing the value of each nonlinear parameter; and optimizing each nonlinear parameter of the merit function while fixing the value of each linear parameter.

8. The method of claim 7, wherein the optimizing each linear parameter of the merit function includes performing linear regression.

9. The method of claim 7, wherein the optimizing each nonlinear parameter of the merit function includes performing a Levenberg-Marquardt method.

10. The method of claim 1, further comprising forming a lookup table that implements said transformation function and said associated determined optimal parameter values, wherein the registering includes applying the first image to the lookup table to generate the third image.

11. The method of claim 1, wherein the optimizing the merit function further includes:

determining a preliminary set of optimal values of the parameters using data in the first and second images;

generating a joint histogram of pixel value pairs of the first and second images using the preliminary set of optimal values of the parameters, the joint histogram having its mass centered about a curve;

identifying outliers as points in the joint histogram that exceed a predetermined distance from the curve of the joint histogram;

determining pixel value pairs in the first and second images corresponding to the outliers; and repeating the optimizing the merit function using data in the first and second images without the pixel value pairs corresponding to the outliers.

12. The method of claim 1, wherein each of the first and second images includes a target portion and a remainder portion, the method further comprising:

cropping each of the first and second images to contain only the respective target portion prior to the optimizing.

13. The method of claim 1, wherein each of the first and second images is a mammogram.

14. The method of claim 1, wherein each of the first and second images is selected from a digitized analog image and a digitally acquired image.

15. A system for registering a first image to a second image, the first and second images being medical images in digital form of one of a same body part and respective corresponding body parts, the system comprising:

a processor optimizing a merit function containing a plurality of parameters associated with a transformation function for simultaneous geometric and grayscale registering of the first and second images relative to each other, the processor optimizing the merit function by determining optimal values of the parameters using the data in the first and second images, the processor further registering the first image to the second image by applying the geometric and grayscale transformation function using the optimal values of the parameters to generate a third image, the third image being transformed from the first image and registered to the second image.

16. The system of claim 15, wherein the processor further performs computer aided detection processing including comparing the second and third images, the system further comprising:

a display device displaying the second and third images with results of the computer aided detection processing.

17. The system of claim 15, wherein said plurality of parameters includes (i) at least one grayscale mapping parameter corresponding to a predetermined model of medical image acquisition associated with said first and second images, and (ii) at least one geometric mapping parameter corresponding to a predetermined model of a geometrical relationship between said first and second images.

18. The system of claim 17, wherein said first and second images are mammograms, and wherein said predetermined model of medical image acquisition associated with said first and second images is selected from the group consisting of: a first model in which the first image is a digitized analog mammogram and the second image is a digitized analog mammogram; a second model in which the first image is a digitized analog mammogram and the second image is a digitally acquired mammogram; a third model in which the first image is a digitally acquired mammogram and the second image is a digitized analog mammogram; and a fourth model in which the first image is a digitally acquired mammogram and the second image is a digitally acquired mammogram.

19. The system of claim 18, wherein the parameters include at least one linear parameter and at least one nonlinear parameter and wherein, for each iterative optimization process, the processor optimizes each linear parameter of the merit function while fixing the value of each nonlinear parameter and optimizes each nonlinear parameter of the merit function while fixing the value of each linear parameter.

20. The system of claim 18, wherein the processor optimizes each linear parameter of the merit function by performing linear regression.

21. The system of claim 18, wherein the processor optimizes each nonlinear parameter of the merit function by performing a Levenberg-Marquardt method.

22. The system of claim 15, wherein the processor iteratively performs an optimization process from a coarse resolution to a fine resolution of the images, and wherein the processor further utilizes results from a previous iteration in each iterative optimization process.

23. The system of claim 15, wherein the processor registers the first image to the second image by generating a simultaneous geometric and grayscale transformation lookup table and utilizes the lookup table to generate the pixel values of the third image from the first image.

24. The system of claim 15, wherein the processor optimizes the merit function by:
  determining a preliminary set of optimal values of the parameters using data in the first and second images;
  generating a joint histogram of pixel value pairs of the first and second images using the preliminary set of optimal values of the parameters, the joint histogram having its mass centered about a curve;
  identifying outliers as points in the joint histogram that exceed a predetermined distance from the curve of the joint histogram;
  determining pixel value pairs in the first and second images corresponding to the outliers; and
  repeating the optimizing the merit function using data in the first and second images without the pixel value pairs corresponding to the outliers.

25. A computer readable medium storing computer code for directing a computing apparatus to automatically register a first image and a second image, the first and second images being medical images in digital form of one of a same body part and respective corresponding body parts, comprising:
  computer code for optimizing a merit function containing a plurality of parameters associated with a transformation function for simultaneous geometric and grayscale registering of the first and second images relative to each other, the optimizing of the merit function being performed by determining optimal values of the parameters using data in the first and second images; and
  computer code for registering the first image to the second image by applying the geometric and grayscale transformation function using the optimal values of the parameters to generate a third image, the third image being transformed from the first image and registered to the second image.

26. The computer readable medium of claim 25, further comprising:
  computer code for performing computer aided detection process for comparing the second and third images; and
  computer code for displaying the second and third images with results of the computer aided detection process.

27. The computer readable medium of claim 26, wherein said first and second images are mammograms, and wherein said predetermined model of medical image acquisition associated with said first and second images is selected from the group consisting of: a first model in which the first image is a digitized analog mammogram and the second image is a digitized analog mammogram; a second model in which the first image is a digitized analog mammogram and the second image is a digitally acquired mammogram; a third model in which the first image is a digitally acquired mammogram and the second image is a digitized analog mammogram; and a fourth model in which the first image is a digitally acquired mammogram and the second image is a digitally acquired mammogram.

28. The computer readable medium of claim 27, wherein the parameters include at least one linear parameter and at least one nonlinear parameter and wherein the computer code for performing each iterative optimization process includes:
  computer code for optimizing each linear parameter of the merit function while fixing the value of each nonlinear parameter; and
  computer code for optimizing each nonlinear parameter of the merit function while fixing the value of each linear parameter.

29. The computer readable medium of claim 28, wherein the computer code for optimizing each linear parameter of the merit function includes computer code for performing linear regression.

30. The computer readable medium of claim 28, wherein the computer code for optimizing each nonlinear parameter of the merit function includes computer code for performing a Levenberg-Marquardt method.

31. The computer readable medium of claim 25, wherein said plurality of parameters includes (i) at least one grayscale mapping parameter corresponding to a predetermined model of medical image acquisition associated with said first and second images, and (ii) at least one geometric mapping parameter corresponding to a predetermined model of a geometrical relationship between said first and second images.

32. The computer readable medium of claim 25, wherein the computer code for optimizing includes computer code for iteratively performing an optimization process from a coarse resolution to a fine resolution of the images, and wherein each iterative optimization process utilizes results from a previous iteration.

33. The computer readable medium of claim 25, wherein the computer code for optimizing the merit function further includes:
  computer code for determining a preliminary set of optimal values of the parameters using data in the first and second images;
  computer code for generating a joint histogram of pixel value pairs of the first and second images using the preliminary set of optimal values of the parameters, the joint histogram having its mass centered about a curve;
  computer code for identifying outliers as points in the joint histogram that exceed a predetermined distance from the curve of the joint histogram;
  computer code for determining pixel value pairs in the first and second images corresponding to the outliers; and
  computer code for repeating the optimizing the merit function using data in the first and second images without the pixel value pairs corresponding to the outliers.

* * * * *